W. E. HOSCH.
CLOTH MEASURING AND COMPUTING MACHINE.
APPLICATION FILED FEB. 8, 1915.
1,298,162.
Patented Mar. 25, 1919.
3 SHEETS—SHEET 1.
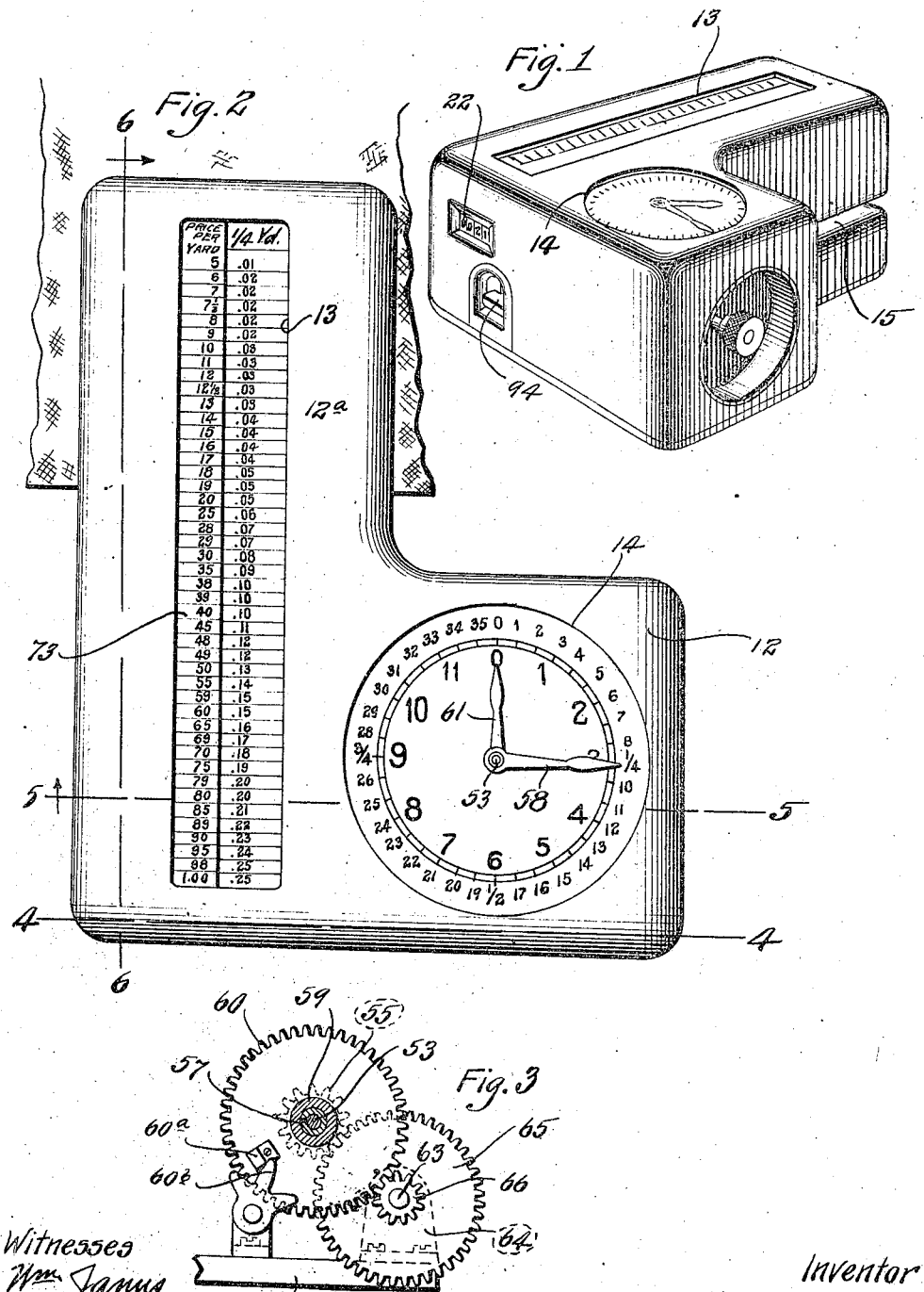
Witnesses
Inventor
Walter E. Hosch W. E. HOSCH.
CLOTH MEASURING AND COMPUTING MACHINE.
APPLICATION FILED FEB. 8, 1915.

1,298,162.
Patented Mar. 25, 1919.
3 SHEETS—SHEET 2.

Witnesses
Wm. Janus
W. C. Smith

Inventor
Walter E. Hosch
By J. K. Cornwall, Atty.

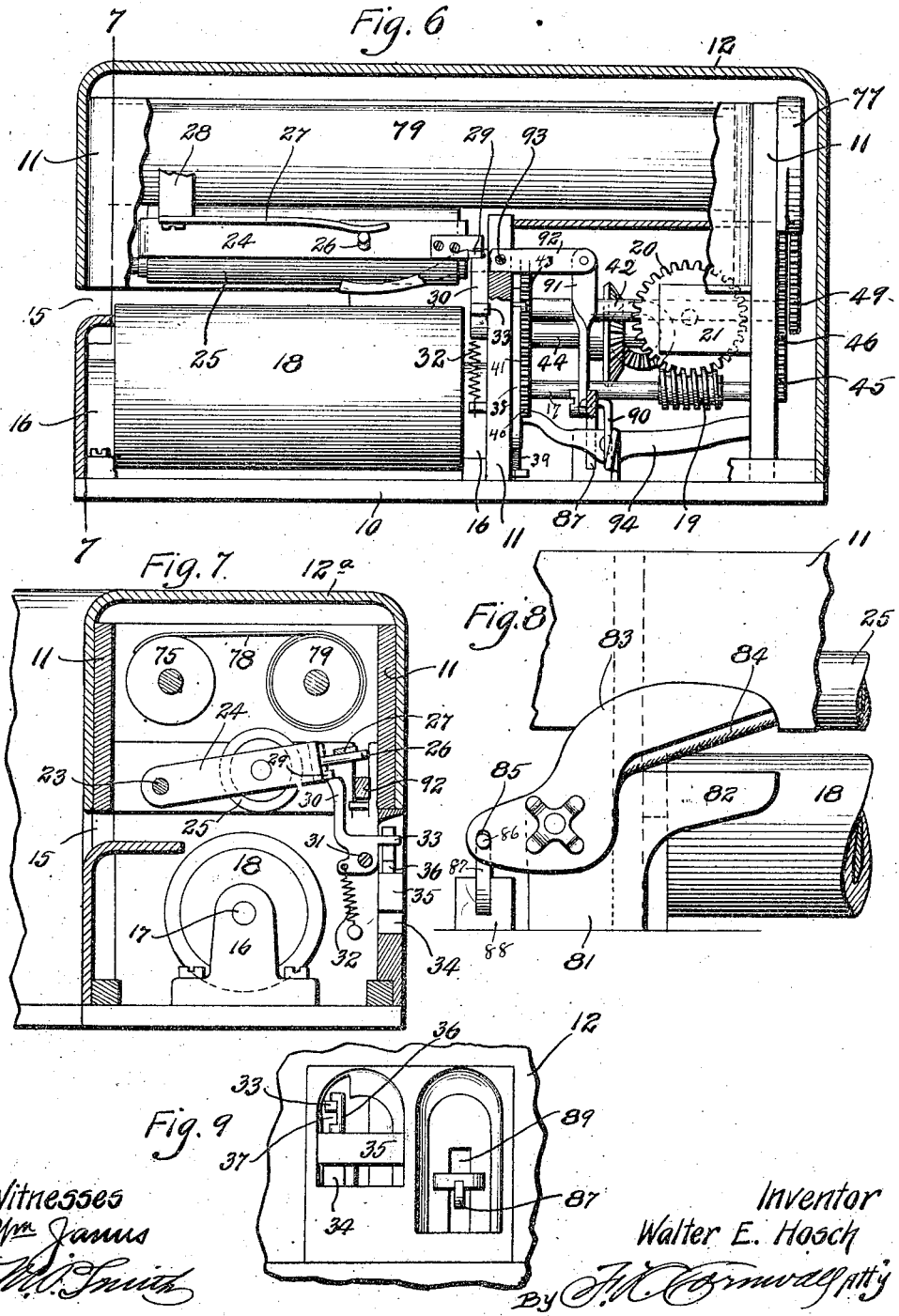

UNITED STATES PATENT OFFICE.

WALTER E. HOSCH, OF ST. LOUIS, MISSOURI, ASSIGNOR TO THE MEASUREGRAPH COMPANY, OF ST. LOUIS, MISSOURI, A CORPORATION OF MISSOURI.

CLOTH MEASURING AND COMPUTING MACHINE.

1,298,162.  Specification of Letters Patent.  Patented Mar. 25, 1919.

Application filed February 8, 1915. Serial No. 6,954.

*To all whom it may concern:*

Be it known that I, WALTER E. HOSCH, a citizen of the United States, residing at city of St. Louis, State of Missouri, have invented a certain new and useful Improvement in Cloth Measuring and Computing Machines, of which the following is a full, clear, and exact description, such as will enable others skilled in the art to which it appertains to make and use the same, reference being had to the accompanying drawings, forming part of this specification, in which—

Figure 1 is a perspective view of a cloth measuring and computing machine of my improved construction.

Fig. 2 is a plan view of the machine.

Fig. 3 is a detail elevational view of certain gears and pinions forming a part of the operating mechanism of the machine and showing the means employed for stopping the gearing when the indicating hands or counter are at zero.

Fig. 6 is a vertical section taken approximately on the line 6—6 of Fig. 2.

Fig. 7 is a vertical section taken approximately on the line 7—7 of Fig. 6.

Fig. 8 is an enlarged detail section taken approximately on the line 8—8 of Fig. 5, and showing the means utilized for marking the goods while the same is in the machine to indicate the point where said goods is to be cut.

Fig. 9 is an elevational view of the parts seen looking in the direction of the arrow in Fig. 5.

Figure 4:
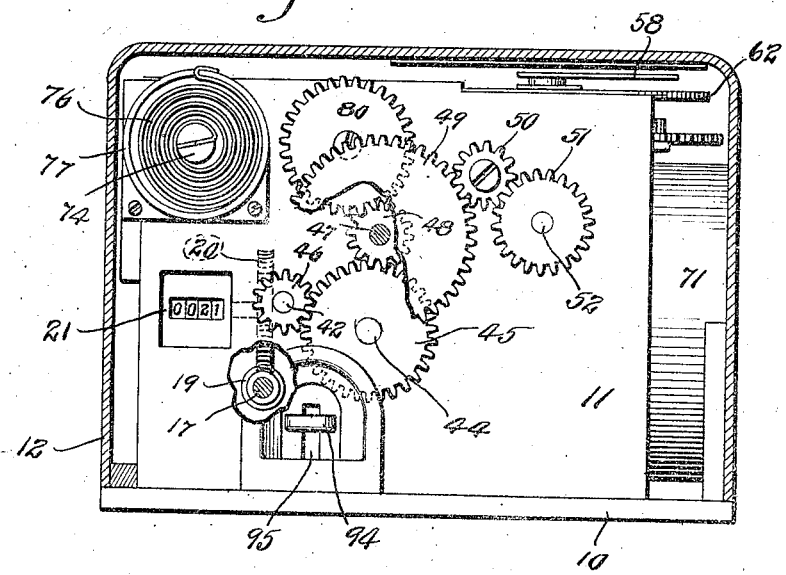
Fig. 4 is a vertical section taken approximately on the line 4—4 of Fig. 2.

My invention relates to new and useful improvements in cloth measuring and computing machines, the principal object of my invention being to provide a comparatively simple compact machine which can be advantageously used on the counters of retail stores for measuring all kinds of piece goods, and which machine is provided with improved means which is operated automatically as the goods is passed through the machine for computing the selling price of that portion of the goods which is measured in the machine.

Further objects of my invention are to provide a machine of the class described with improved measuring mechanism involving a dial having two rows of numerals, to indicate yards and divisions thereof, preferably inches, and to arrange a pair of hands which travel clock-wise over said dials during the measuring operation, thus showing to both operator and purchaser the exact number of yards and inches in the measured piece of goods; to combine with the measuring mechanism a price scale and chart, which latter operates simultaneously with the measuring mechanism so as to show at the completion of the measuring operation the total cost of the piece of measured goods; to provide means for making a short cut in the edge of the goods at the completion of the measuring operation so as to provide an accurate guide for the salesman when severing the piece of measured goods from the bolt; to provide simple means for restoring the indicating hands and chart to home or zero positions and to provide a comparatively simple inexpensive machine wherein the measuring and computing operations are wholly dependent upon the movement of the goods through the machine, thereby requiring no special operation on the part of the salesman.

With the foregoing and other objects in view, my invention consists in certain novel features of construction and arrangement of parts, hereinafter more fully described and claimed.

In the construction of the machine as shown, a base plate 10 serves as a support for a skeleton frame-work 11, the same comprising a series of upright plates and posts of suitable shape to carry the operating mechanism of the machine, and removably positioned on the base and inclosing the frame and operating mechanism is a housing 12, preferably formed of sheet metal.

Located in the left hand portion of the top of this housing as seen in Fig. 2 is an elongated glazed opening 13 through which the price scale and chart are readily visible, and located in the right hand portion of the top of the housing is a round glazed opening 14 through which the yard and inch indicating dials and hands are readily visible.

The machine when viewed in plane is substantially L-shaped as seen in Figs. 1 and 2 and the side walls of the rearward extension 12ª of the housing are provided with slots 15 which are open at their rear ends in order to receive the edge of the goods which is to be measured.

Journaled in suitable bearings 16 Fig. 7 on the left hand portion of the base plate 10 is a shaft 17 on the rear portion of which is fixed a roller 18, preferably rubber-faced, and having a circumference of predetermined length, for instance, four and a half inches which is one-eighth of a yard or six inches or nine inches, as the case may be.

Fixed on the forward portion of this shaft 17 is a worm 19 Fig. 6 which engages a worm wheel 20, the latter being carried by the main shaft of an ordinary counting device 21 Fig. 4, preferably of the type employing a series of disks which are adapted to transfer from one to another, as for instance, units to tens, tens to hundreds, and so on, said counter being located immediately adjacent to the front wall of the housing 12 so that the numbered edges of the disks are visible through a glazed opening 22, in said front wall.

Pivotally mounted on a rod 23 Fig. 7 which is supported in the frame-work of the machine above the slots 15 is a horizontally disposed frame 24 in which is journaled a pressure roller 25, the same being preferably rubber-faced. Projecting outwardly from the frame 24 is a pin 26, and bearing thereupon is the free end of a flat spring 27, the same being fixed to a bracket 28, which latter is mounted on a portion of the frame 11.

During operation of the machine, this spring 27 bears downward upon the frame 24, thereby maintaining the roller 25 with pressure on top of the roller 18, thereby holding the edge of the goods which is being measured in close contact with the surface of said roller 18.

Projecting forwardly from the end of the frame 24 is a finger 29 which is adapted to rest on top of a dog or detent 30, the same being pivotally mounted on a pin 31 which is seated in a portion of the frame 11, and said dog or detent being connected to a retractile spring 32, the tendency of which is to swing the point of said detent toward and into position beneath the finger 29. The detent 30 is provided with a finger 33 which projects outward through an opening 34, the same being formed in the left hand side wall of the housing 12. Arranged for vertical movement in this opening is a block 35 and projecting upwardly therefrom is a pin 36 provided with a notch 37, which latter receives the finger 33.

When the block 35 is moved downward detent 30 will be actuated so as to release the finger 29 and spring 27 now being free to act will move frame 24 and pressure roller 25 downward so that the latter engages the goods positioned on roller 18:

I shall now describe the driving mechanism for connecting the pointer and indicating web, and for driving the same from the rotary member or measuring roller 18; also the means for disconnecting the measuring roller to permit the indicating mechanism to return to zero.

Figure 5:
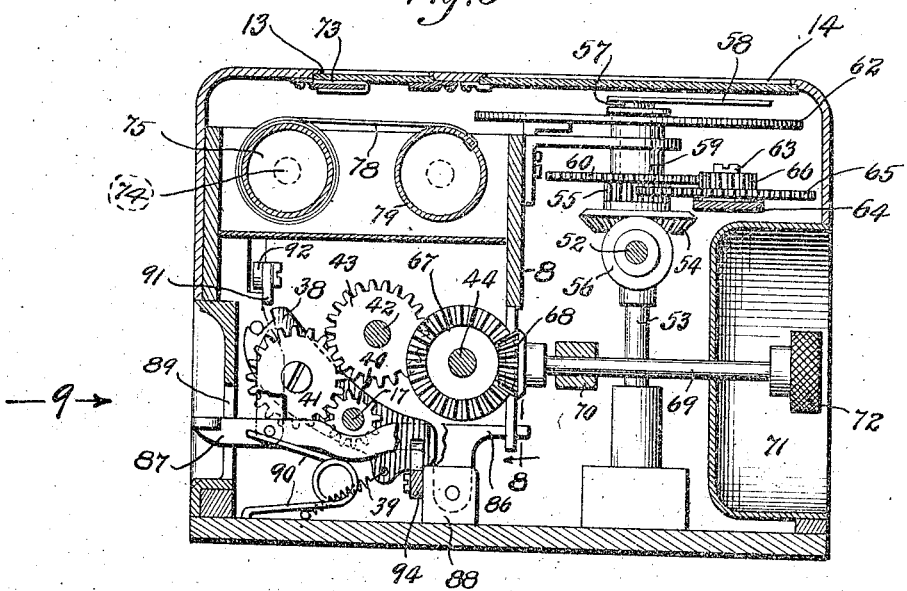
Fig. 5 is a vertical section taken approximately on the line 5—5 of Fig. 2.

Loosely mounted on shaft 17 in front of roller 18 is a plate 38 Fig. 5 to the lower end of which is connected one end of a retractile spring 39 and fixed on the shaft 17 immediately in front of this plate is a pinion 40 which meshes with a pinion 41, the latter being journaled on a pin or stud carried by said plate 38.

Journaled in suitable bearings formed in the frame 11 above the forward portion of the shaft 17 is a shaft 42 and fixed thereon is a pinion 43 with which pinion 41 normally engages. Journaled in suitable bearings to the side shaft 42 is a shaft 44 on the forward end of which is fixed a pinion 45, the same meshing with a pinion 46, which latter is fixed on the forward end of shaft 42.

Journaled in suitable bearings above shaft 44 is a shaft 47 Fig. 4 on which is fixed pinion 48, the same meshing with pinion 45 and fixed on said shaft 47 adjacent to the pinion 48 is a large pinion or gear wheel 49. This gear wheel 49 meshes with a pinion 50, the same being journaled on a stud or pin projecting from a portion of the frame 11 and meshing with said pinion is a pinion 51, the same being carried by a shaft 52, which is journaled in the front portion of frame 11.

Arranged in the right hand portion of frame 11 and beneath the center of glazed opening 14 is a post or standard 53 on which is loosely mounted a beveled pinion 54, the hub of which carries a pinion 55. Fixed on the inner end of shaft 52 is a beveled pinion 56 which meshes with pinion 54.

Fixed to pinions 54 and 55 is a sleeve 57, the upper end of which carries an inch indicating hand or pointer 58. Loosely mounted on sleeve 57 is a sleeve 59, the lower end of which carries a gear wheel 60 and the upper end of which carries a yard indicating hand or pointer 61, the same being somewhat shorter and located immediately below the hand or pointer 58.

Held in fixed position immediately below the glazed opening 14 and the hands 58 and 61 is a horizontally disposed disk 62 on which is formed concentric dials, the outer one being numbered from zero to 35 inclusive and representing inches, and the inner dial being numbered from zero to 11 and indicating yards.

The outer end of pointer 58 traverses a path directly over the dial and the outer end of pointer 61 traverses a path immediately over the inner dial, and thus the operator by knowing the positions of the pointers or hands, can instantly know the amount in yards and inches of cloth which has been measured in the machine.

Loosely mounted on a pin 63 which is fixed to a bracket 64 is a gear wheel 65 which meshes with pinion 55 and fixed to said gear wheel 65 is a pinion 66 which meshes with gear wheel 60.

The relative sizes of the gear wheels and pinions 55, 60, 65 and 66 provide for the proper ratio of speed of the sleeves 57 and 59, and consequently provide for the proper movement of the yard and inch indicating hands 61 and 58.

Carried by gear wheel 60 is a stop lug 60ª Fig. 3 which is adapted to engage against an adjustable finger 60ᵇ, the latter being fixed to a part of frame 11. When lug 60ª engages this stop the various gear wheels and pinions have been moved so as to bring the hands 58 and 61 to zero position on the dial over which they operate.

Fixed on shaft 44 Fig. 5 is a beveled pinion 67 and meshing therewith is a beveled pinion 68, the same being carried on the inner end of a horizontally disposed shaft 69, which latter is journaled in a bearing 70. The outer portion of this shaft 69 projects through an inset portion 71 of the right hand wall of the housing 12 and fixed on the outer end of said shaft is a milled disk 72.

Shaft 69 is operated by engaging the disk 72 between the thumb and finger, which operation takes place when it is desired to ascertain the selling price of a piece of goods, the length of which is known without passing the goods through the machine.

Supported in any suitable manner immediately beneath the left hand portion of the section of glass or transparent material which closes the opening 13 is a strip 73 of cardboard, thin celluloid, or analogous material, on which is printed a row of numerals which indicate the price per yard of goods measured in the machine.

Journaled in suitable bearings beneath the left hand portion of the top of the housing 12 are the trunnions 74 of a drum 75 and fixed to one of said trunnions is the inner end of a spiral spring 76 Fig. 4, the same being arranged in a suitable housing 77 to which latter the outer end of said spring is connected. The tendency of this spring is to rotate the drum 75 anti-clockwise. One edge of a flexible member 78 is attached to the drum 75 and the body portion of said flexible member is wound upon said drum.

Appearing on the face of this flexible member are columns of figures which represent the total amounts or prices to be paid for the goods measured in machine and the numbers in these rows are spaced so that they will occupy positions directly opposite the numbers on the strip 73 and which designate the price per yard. The outer end of the flexible member 78 is attached to a drum 79, the same having trunnions, which are mounted in suitable bearings in the frame 11, and fixed on the front one of these trunnions is a pinion 80 Fig. 4 which meshes with the pinion 48.

Fixed to the frame 11 immediately inside the right hand wall of the extension 12ª and below the right hand one of the slots 15 is an upright plate 81 Fig. 8, the same being provided with an extension 82 which projects alongside of the forward end of roller 18 and the upper edge of this extension is sharpened to form a cutting edge.

Pivotally mounted on plate 81 is a jaw 83 which is provided with a cutting edge 84 which opposes the cutting edge on the extension 82, and formed in the rear end of this plate 83 is an aperture 85. This aperture receives a pin 86 which is formed on the rear end of a horizontally disposed lever 87, the same being pivotally mounted on a bracket 88, and the outer end of this lever extends through a slot 89 in the left hand side wall of the housing 12.

A spring 90 Fig. 5 is fixed to base 10 and normally exerts upward pressure against the outer portion of lever 87. Pivotally connected to lever 87 is the lower end of a link 91, the upper end thereof being pivotally connected to one end of a lever 92 Fig. 6, the same being fulcrumed at 93 to a portion of the frame 11 and the rear free end of said lever occupies a position beneath pin 26 Fig. 7.

Pivotally mounted on bracket 88 Fig. 5 at right angles to lever 87 is a lever 94, the outer end of which projects through a slot 95 Fig. 4 in the front wall of housing 12 and the rear end of this lever is pivotally connected to the lower end of plate 38 Fig. 6.

When the outer end of lever 94 is depressed, plate 38 is swung upon shaft 17 so as to disengage pinions 41 and 43 Fig. 5.

My improved machine can be fixed to a counter or the like, or it may be unattached and free to be moved from place to place to suit requirements of the store keeper.

The operation of my improved machine is as follows:

When the machine is ready for use, the hands or pointers 58 and 61 are at the zero marks on the dial immediately below the glazed opening 14, and the chart or flexible member 78 is wound on drum 75. Pressure roller 25 is held in elevated position as seen in Fig. 7 by the engagement of the upper end of dog 30 against finger 29.

The operator now inserts the edge of the goods to be measured through the rear open ends of slots 15 and brings the goods forwardly until the same occupies a position between the rollers 18 and 25. The block 35 is now moved downward and pin 36 (Fig.

9) engaging with finger 33 shifts dog 30 so as to release finger 29, thereby permitting frame 24 and pressure roller 25 to move downward under the influence of spring 27 (Fig. 6).

It will be understood that the roller 25 engages on top of the goods and presses the same against the surface of roller 18 and this frictional engagement with said last mentioned roller causes the same to rotate as the goods is pulled through the machine.

The operator now engages the end of the piece of goods and pulls the same toward the right hand, at the same time manipulating the bolt of goods which is located to the left hand of the machine so that said goods will feed or travel in a proper manner to the machine and between the rollers. During this time, the operator glances at the hands traveling over the concentric dials and thus readily ascertains the amount of goods being measured off.

As roller 18 rotates under the frictional engagement with the goods, shaft 17 and worm 19 are rotated, thus driving worm wheel 20 which in turn operates the total counting wheels contained within housing 21 (Fig. 4). Pinion 40 (Fig. 5) on shaft 17 drives pinion 41, the same meshing with pinion 43, thus rotating shaft 42 and pinion 46 carried by the end of this last mentioned shaft drives pinion 45 (Fig. 4) which meshes with pinion 48, and thus rotary motion is imparted to gear wheel 49 which meshes with pinion 50 and the latter meshing with pinion 51. This last mentioned pinion is mounted on shaft 52 which carries beveled pinion 56, the same meshing with beveled pinion 54, the hub of which carries pinion 55.

Sleeve 57 is fixed to pinion 55 and hand or pointer 58 carried by said sleeve will be moved over the outer row of figures on the dial, thereby indicating the number of inches of goods as the same is drawn through the machine. Pinion 55 drives gear wheel 65, the same carrying pinion 66 and the latter drives gear wheel 60 which is fixed to sleeve 59, the latter carrying hand or pointer 61.

The relative sizes of the pinions and gear wheels just mentioned is such that sleeve 59 carries hand or pointer 61 so as to travel the distance of one space or division on the inner row of figures on the dial and which inner row indicates yards. During this movement, pinion 48 drives gear wheel 80 (Fig. 4), thereby imparting rotary movement to drum 79 and as a result, the flexible member or chart 78 is unwound from drum 75 and winds onto said drum 79, and as a result the columns of figures on the face of said chart which indicate the total amounts to be charged for the measured goods will successively appear immediately to the right hand edge of the strip 73. During this movement of drum 75, spring 76 will be wound up within its housing 77.

When the proper amount of yards has been drawn through the machine and indicated by the hands 58 and 61 on the circular dials, the salesman glances at the number on the strip 73 which corresponds to the price per yard at which the goods is sold and then notes immediately to the right of this number, the number in the column on the chart, thus instantly ascertaining the total amount to be charged for the goods measured.

It will be understood that the columns of figures on the chart are made up and are in proper relation to the column of price numbers appearing on the strip 73, and these numbers can vary according to the class of goods to be measured with the machine.

When the piece of goods has thus been properly measured, the operator bears downward upon the outer end of lever 87 (Fig. 5) thereby tilting said lever and moving the rear end of plate 83 (Fig. 8) upward, thereby causing the forward edged portion of said plate to move downward past edged arm 82 and consequently forming a cut in the edge of the goods which serves to guide the salesman in severing the measured piece of goods from the plate.

Simultaneously with this depression of lever 87, link 91 is drawn downward, thereby tilting lever 92 (Fig. 6) and the forward free end thereof will engage beneath pin 26, thereby elevating the same, the frame 24 and pressure roller 25, thus freeing the goods and permitting both the end of the bolt and the measured piece to be removed.

When frame 24 has been elevated to the position shown in Fig. 7, the upper end of dog 30 will reëngage beneath finger 29, thereby holding the frame and pressure roller in their elevated positions.

To bring the various parts of the machine back to normal positions and the hands 58 and 61 to zero positions, the operator depresses the forward end of lever 94 (Fig. 1), thereby raising the rear end thereof and swinging plate 38 (Fig. 5) upon shaft 17, which movement disengages pinion 41 from pinion 43 and as soon as this movement takes place, the power stored in coil spring 76 will act to rewind the chart onto roller 75 and through the medium of the various gears and pinions heretofore described, the hands 58 and 61 will be returned to zero position upon the dial.

As hereinbefore stated, in case a salesman desires to quickly and accurately compute the total cost of a piece of goods, the exact length of which is known, the operation can be performed by engaging the disk 72 between the thumb and forefinger and rotating shaft 69, which action imparts rotary movement to shaft 44 and through the various connections as hereinbefore described, the hands will be moved until they occupy positions to indicate the number of yards and inches in the piece of goods and the operator, by glancing at the number on the chart opposite the number corresponding to the price per yard, ascertains the total amount to be charged for the goods.

A cloth measuring and computing machine of my improved construction is comparatively simple, is very compact, saves much time and labor in measuring and computing the cost of piece goods, is accurate in operation, and is effective in eliminating the cutting off of short and over-length pieces of goods by a salesman, and likewise eliminates mistakes in calculating the total cost of odd lengths of goods at a price per yard which runs into fractions.

It will be readily understood that minor changes in the size, form and construction of the various parts of my improved machine can be made and substituted for those herein shown and described, without departing from the spirit of my invention, the scope of which is set forth in the appended claims.

I claim:

1. In a machine of the class described, the combination with a rotary member adapted to be actuated by the movement of the goods to be measured, of a dial, an index hand movable over the dial, means for effecting a movement of the indicating hand corresponding to the movement of the rotary member, a stationary price scale, a chart coöperating with said price scale, which chart bears rows of figures indicating price totals of yards of goods and fractional parts thereof, a pair of drums on which said chart is mounted, means for driving one of said drums and for imparting movement to said chart corresponding to the movement of the rotary member and the index hand, and manually operable means independent of the said rotatable member for actuating the index hand and the chart.

2. In a machine of the class described, a rotary member adapted to be actuated by the movement of goods through the machine, means including two sets of figures and a pair of index hands for indicating yards and fractional parts thereof, price computing means including a stationary price scale and a coöperating movable chart bearing rows of numerals indicating price totals of yards of goods and fractional parts thereof, a pair of drums upon which said chart is mounted, driving means from the rotary member to one of said drums for actuating said chart, a total counting mechanism, and means adapted to be actuated by the rotary member for simultaneously operating the index hands, and the total counting mechanism respectively.

3. In a machine of the class described, a rotary member adapted to be actuated by the movement of the goods through the machine, means including a pair of dials and a pair of index hands for indicating yards and fractional parts thereof, price computing means including a stationary price scale, a coöperating movable chart bearing rows of numerals indicating price totals of yards of goods and fractional parts thereof, and a pair of drums on which the movable chart is mounted, a total counting mechanism, means adapted to be actuated by the rotary member for simultaneously operating the index hands, the price computing means and the total counting mechanism respectively, and manually operable means for slitting the edge of the goods which passes through the machine.

4. In a machine of the class described, a rotary member adapted to be actuated by the movement of goods through the machine, a dial, an indicating hand coöperating with said dial, price computing means including a stationary price scale and a coöperating movable chart including rows of numerals indicating price totals of yards of goods and fractional parts thereof, a pair of drums upon which said chart is mounted, a spring connected to one of said drums for imparting movement thereto for the purpose of rewinding the chart thereon, means connecting said hand with said price computing means so that when the price computing means is set back to zero said hand will also be set back to zero, a driving connection for driving said hand and said chart from said rotary member, and means for disconnecting the said driving connection to permit said spring to set back the price computing means and said hand to the zero position.

5. In a machine of the class described, a rotary member adapted to be actuated by the movement of goods through the machine, a dial, an indicating hand coöperating with said dial, price computing means including a stationary price scale and a coöperating movable chart including rows of numerals indicating price totals of yards of goods and fractional parts thereof, a pair of drums upon which said chart is mounted, a spring connected to one of said drums for imparting movement thereto for the purpose of rewinding the chart thereon, means connecting said hand with said price computing means so that when the price computing means is set back to zero said hand will also be set back to zero, a driving connection for driving said hand and said chart from said rotary member including a pair of normally meshing gears, a rocking plate carrying one of said gears and means for rocking said plate to separate said gears and permit said spring to set back the price computing means and said hand to zero position independently of said rotary member.

6. In a machine of the class described, a rotary member adapted to be actuated by the movement of goods through the machine, a dial, an indicating hand coöperating with said dial, price computing means including a stationary price scale and a coöperating movable chart including rows of numerals indicating price totals of yards of goods and fractional parts thereof, a pair of drums upon which said chart is mounted, a spring connected to one of said drums for imparting movement thereto for the purpose of rewinding the chart thereon, means connecting said hand with said price computing means so that when the price computing means is set back to zero said hand is simultaneously set back to zero, a driving connection for driving said hand and said chart from said rotary member, means for disconnecting the said driving connection at the will of the operator, and manually operated means for simultaneously driving said hand and said price computing means when the same are disconnected from said rotary member.

7. In a machine of the class described, a rotary member mounted so as to be actuated by goods passed through the machine, a spring-pressed frame adjacent to said rotary member, a roller carried by said spring-pressed frame for engaging the goods to press the same against the rotary member, a catch for engaging said frame to hold the same and the pressure roller away from the rotary member, manually operated means for releasing said catch, and manually operated means for moving the pressure roller and the frame away from the rotary member to enable said catch to engage and hold the frame.

In testimony whereof I hereunto affix my signature in the presence of two witnesses, this 4th day of February, 1915.

WALTER E. HOSCH.

Witnesses:
M. P. SMITH,
M. A. HANDEL.